US011151449B2

(12) United States Patent
Suzuki et al.

(10) Patent No.: US 11,151,449 B2
(45) Date of Patent: Oct. 19, 2021

(54) ADAPTATION OF A TRAINED NEURAL NETWORK

(71) Applicant: INTERNATIONAL BUSINESS MACHINES CORPORATION, Armonk, NY (US)

(72) Inventors: Masayuki Suzuki, Tokyo (JP); Toru Nagano, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 941 days.

(21) Appl. No.: 15/878,933

(22) Filed: Jan. 24, 2018

(65) Prior Publication Data
US 2019/0228298 A1   Jul. 25, 2019

(51) Int. Cl.
*G06N 3/08* (2006.01)
*G06N 5/02* (2006.01)

(52) U.S. Cl.
CPC ............. *G06N 3/08* (2013.01); *G06N 5/02* (2013.01)

(58) Field of Classification Search
CPC .......... G06N 3/02; G06N 3/08; G06N 3/082; G06N 3/084; G06N 5/02; G06N 20/10; G06N 20/00; G06N 20/20
See application file for complete search history.

(56) References Cited

U.S. PATENT DOCUMENTS

| 5,461,699 | A | * | 10/1995 | Arbabi | ............ G06N 3/04 706/21 |
|---|---|---|---|---|---|
| 6,804,600 | B1 | * | 10/2004 | Uluyol | ............ G05B 9/02 123/479 |
| 2016/0247501 | A1 | * | 8/2016 | Kim | ............ G06F 40/289 |
| 2017/0024642 | A1 | | 1/2017 | Xiong et al. | |
| 2017/0185895 | A1 | | 6/2017 | Chen et al. | |
| 2017/0323200 | A1 | * | 11/2017 | Corvinelli | ......... G06F 16/24545 |
| 2018/0293721 | A1 | * | 10/2018 | Gupta | ............ G05B 19/41875 |
| 2018/0365824 | A1 | * | 12/2018 | Yuh | ............ G06T 7/0012 |

FOREIGN PATENT DOCUMENTS

WO      2017151757 A1      9/2017

OTHER PUBLICATIONS

Li et .al., "Revisiting Batch Normalization For Practical Domain Adaptation", 2016, Pattern Recognition, vol. 80, pp. 1-12 (Year: 2016).*
Sergey Ioffe and Christian Szegedy, "Batch normalization: accelerating deep network training by reducing internal covariate shift", International Conference on Machine Learning, 2015, vol. 37, pp. 448-456 (Year: 2015).*

(Continued)

*Primary Examiner* — Ann J Lo
*Assistant Examiner* — Leonard A Sieger
(74) *Attorney, Agent, or Firm* — Tutunjian & Bitetto, P.C.; Randall Bluestone

(57) ABSTRACT

A method, computer program product, and apparatus for adapting a trained neural network having one or more batch normalization layers are provided. The method includes adapting only the one or more batch normalization layers using adaptation data. The method also includes adapting the whole of the neural network having the one or more adapted batch normalization layers, using the adaptation data.

17 Claims, 9 Drawing Sheets

(56) References Cited

OTHER PUBLICATIONS

Côté-Allard et al., "Transfer learning for sEMG hand gestures recognition using convolutional neural networks," 2017, IEEE International Conference on Systems, Man, and Cybernetics (SMC), 2017, pp. 1663-1668 (Year: 2017).*
Yin "A Deep Normalization and Convolutional Neural Network for Image Smoke Detection", IEEE Access vol. 5, Aug. 2017, p. 18429-18438.
Ioffe, "Batch Normalization: Accelerating Deep Network Training by Reducing Internal Covariate Shift", arXiv: 1502.03167, Feb. 2015, pp. 1-9.
Li, "Revisiting Batch Normalization for Practical Domain Adaptation", arXiv: 1603.04779v4, Nov. 2016, pp. 1-12.
Suzuki, "Inference-Invariant Batch Normalization for Domain Adaptation of Acoustic Model", IBM Research AI, 2017, pp. 1-5.

* cited by examiner

ADAPTATION OF A TRAINED NEURAL NETWORK

BACKGROUND

Technical Field

The present invention relates generally to a neural network, and more particularly to an adaptation of a trained neural network having batch normalization layers.

Description of the Related Art

The neural network has developed the state of the art in, for example, vision, speech or image recognition, and many other areas.

The neural network utilizes plural layers of non-linear hidden layers between its input and output layers. Each of the non-linear hidden units has a weight vector which is determined during training of the neural network (i.e. in the training stage).

The training of the neural network is complicated by the fact that distribution of each layer's inputs changes during the training stage, because parameters of previous layers change. This makes the training slow down by requiring lower training rates and careful parameter's initialization.

The change in the distribution of each internal node in the neural network, in the training stage, is called as an internal covariate shift. The internal covariate shift causes inefficiency of training the neural network.

The mechanism called "Batch Normalization", also known as batchnorm, was proposed in order to overcome the aforesaid internal covariate shift (see Sergey Ioffe et. al., "Batch Normalization: Accelerating Deep Network Training by reducing Internal Covariate Shift". 2015, cited as "arXiv: 1502.03167v3"). The batch normalization is a powerful technique for accelerating and improving neural networks, such as deep neural networks. The batch normalization controls the distribution of feed-forward neural network activations, thereby reducing the aforesaid internal covariate shift.

Further, another mechanism called "Adaptive Batch Normalization", or "AdaBN", for a batch normalized DNN domain adaptation was also proposed (see Yanghao Li et. Al., "Revisiting Batch Normalization For Practical Domain Adaptation", 2017, cited as "arXiv:1603.04779v4"). In the AdaBN, averaged normalization for an inference mode is replaced using statistics of adaptation data. Further, in the AdaBN, the standardization of each layer by a domain ensures that each layer receives data from a similar distribution, no matter it comes from a source domain or a target domain. Accordingly, the AdaBN changes inference results and has good effect for domain adaptation of image classification tasks. In the AdaBN, only the mean and variance of the target domain is computed as seen in the Algorithm 1 and then a mean and a variance of the batch normalization are replaced with the computed mean and variance to update the neural network as the neural network with the adapted batch normalization. Accordingly, this neural network with the adapted batch nomialization is directly used in an operation mode.

SUMMARY

Aspects of the present invention are directed to a method, computer system, and computer program product for adapting a trained neural network having one or more batch normalization layers.

According to an aspect of the present invention, a computer-implemented method for adapting a trained neural network having one or more batch normalization layers is provided. The method comprises adapting only the one or more batch normalization layers using adaptation data; and adapting the whole of the neural network having the one or more adapted batch normalization layers, using the adaptation data.

According to an aspect of the present invention, a computer system is provided. The computer system may include one or more computer processors, and a memory storing a program which, when executed on the processor, performs an operation for performing the disclosed method.

According to an aspect of the present invention, a computer program product is provided. The computer program product may comprise a computer readable storage medium having program instructions embodied therewith. The program instructions are executable by a computer to cause the computer to perform the disclosed method.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Figure 1:
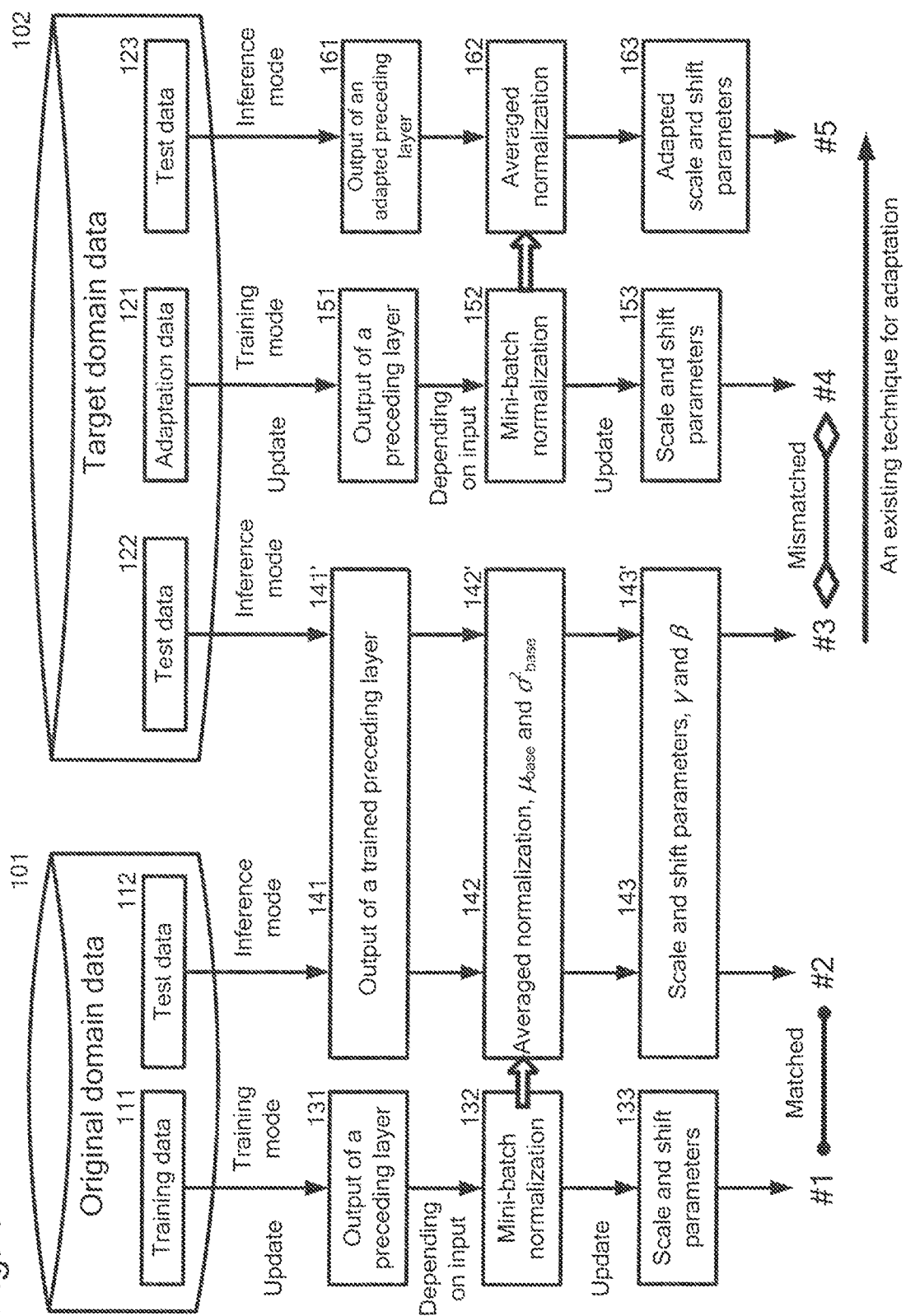
FIG. 1 is a block diagram depicting the existing method of adaptation of a neural network having batch normalization layers.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by those of skill in the art, an embodiment of the present invention may be embodied as a method, a computer system, or a computer program product. Accordingly, an embodiment of the present invention may take the form of an entirely hardware-based embodiment, an entirely software-based embodiment, including, for example, firmware, resident software ad micro-code, and the like, or may take the form of an embodiment combining software-based and hardware-based aspects, which may be collectively referred to herein as a "circuit," a "module," or a "system".

As used herein, the expression "a/one" should be understood as "at least one." The expression "comprise(s)/comprising a/one" should be understood as "comprise(s)/comprising at least one." The expression "comprise(s)/comprising" should be understood as "comprise(s)/comprising at least." The expression "/" should be understood as "and/or."

To define more clearly terms as used herein, exemplified definitions of the terms are provided hereinafter, this should be interpreted broadly as known to a person skilled in the art or a technical field to which the present invention pertains.

As used herein, the term "a neural network" refers to any neural networks, such as deep neural network, for example, Convolution Neural Network (CNN); Recurrent Neural Network (RNN) such as Long Short-term Memory (LSTM); or Feed-forward Neural Network. The neural network typically may have the following layers: an input layer, hidden layers and an output layer.

As used herein, the term "adaptation data" refers to any data used for adapting parameters of each batch normalization layer in a neural network or for adapting the whole of a neural network having batch normalization layers. Adaptation data used in an embodiment of the present invention may be derived from target domain data. Thus, it can be herein said that adaptation data may be adaptation data derived from target domain data, unless otherwise stated.

As used herein, the term "training" or "retraining" refers to the process by which a neural network develops and generates an operating model based on training data uploaded or input to the neural network.

As used herein, the term "training data" or "training dataset" refers to a set of any data and information input to a neural network. The training data may comprise, for example, documents or texts, representative of questions, statements, utterances, expressions, sentiments, exclamations, commands, concepts, ideas, or the like, that have been mapped or labeled to specify to which class the documents or texts may correlate, correspond, or otherwise belong. The training data may take the form of, for example, electronic files or records.

As used herein, the term "batch normalization", also known as batchnorm, refers to a technique described in the aforesaid Sergey Ioffe et. al. Recently, many existing neural networks models have batch normalization layers in it in order to accelerate training of the neural networks. The batch normalization has been used in many state of the art deep neural networks including convolutional neural networks; Recurrent Neural Network (RNN) such as Long Short-term Memory (LSTM); Feed-forward Neural Network.

The batch normalization is originally designed to alleviate the issue of an internal covariate shifting which is a common problem while training of the neural network, and in doing so dramatically accelerated the training of neural networks. This is accomplished by a normalization step that fixes a mean and a variance of each layer input.

Briefly, the batch normalization can be done by the following steps.

1) Normalize a mini-batch output x as x'=(x−m)/v, where m denotes a value of a mean of a mini-batch; and v denotes a value of variance (i.e. standard deviation) of a mini-batch; and 2) Scale and shift x' as g x'+b, where g denotes a scale parameter to be trained and b denotes a shift parameter to be also trained.

A mini-batch size can be determined arbitrarily as long as the size is enough small to fit in a memory size of a graphical processing unit (GPU) because required memory size used for backpropagation algorithm is proportional to the mini-batch size. For example, the following method may be used to determine the mini-batch size: A mini-batch size is selected among several candidates and then each selected mini-batch size is evaluated to choose the best mini-batch size among the mini-batch sizes. For example, mini-batch sizes, 64, 128, 256 and 512 are used as candidates of mini-batch sizes.

The batch normalization in the training mode normalizes input activations in a mini-batch using a mean and a variance of the mini-batch. The input activations denote an output of a layer preceding a batch normalization layer and also an input to this batch normalization layer.

On the other hand, the batch normalization in the inference mode uses averaged mean of training data and averaged variance of training data. The averaged mean of training data may be estimated as a final value of running mean, rm, during the training. The averaged variance of the training data may be estimated as a final value of running variance, rv, during the training.

As used herein, the term "a batch normalization layer" refers to a layer in which the aforesaid batch normalization is performed for the purpose of keeping distribution of an input of each layer constant. Each layer in a neural network except for an output layer may have a batch normalization layer immediately after the layer to leverage batch normalization as the input-to-hidden or hidden-to-hidden transformation.

Neural networks with batch normalization layers may be used for domain adaptation and transfer learning as initial points. For example, a neural network used for a general purpose acoustic model which was trained using large amount of various data is a better initial point to train, for example, an acoustic model for a specific call center with small amount of adaptation data derived from target domain data. For another example, in a low resource language scenario, a neural network used for an acoustic model which was trained using rich resource language data or multiple low resource language data is a better starting point to train an acoustic model of a target low resource language by replacing and randomly initializing only the top softmax layer.

The batch normalization can significantly reduce the number of iteration to converge, and further improve the final performance at the same time. Further, the batch normalization makes it possible to use significantly higher learning rates, and reduces the training steps. Further, the batch normalization makes it possible to reduce the sensitivity to initialization.

One example of an existing technique of adaptation of a neural network having batch normalization layers will be first explained below by referring to FIG. 1.

With reference now to FIG. 1, FIG. 1 is a block diagram depicting the existing method of adaptation of a neural network having batch normalization layers.

Original domain data (101) and target domain data (102) may be separately prepared in advance. The original domain data (101) may by any general domain data and also called as a source domain data. The target domain data (102) may be any special domain data such as a domain data for a call center.

A data size of the original domain data (101) may be greater than that of the target domain data (102).

The original domain data (101) is divided into training data (111) which can be used for training the neural network and test data (112) which can be used for evaluating the trained neural network. The division of the original domain data (101) may be done, for example, by randomly separating the original domain data (101) into training data (111) and test data (112).

The target domain data (102) is divided into adaptation data (121) and test data (122 and 123). Please note that the test data (122) is the same with the test data (123). The division of the target domain data (102) may be done, for example, by randomly separating the target domain data (102) into the adaptation data (121) and the test data (122 and 123).

First, a basic neural network as a base model may be trained in the following "#1", using the original domain data (101).

"#1" in FIG. 1 shows a forward pass in a batch normalization layer and a layer preceding the batch normalization layer (hereinafter referred to as "preceding layer") in a training mode, using the training data (111) derived from the original domain data (101). In the forward pass as depicted in "#1", a basic neural network as a base model may be trained using the training data (111).

The preceding layer may be any layer preceding each batch normalization layer in the neural network. The preceding layer may be an input layer or each of hidden layers.

The forward pass, "#1", described here applies to all combinations of a preceding layer and a batch normalization layer in the neural network.

First, the output of the preceding layer is given to the batch normalization layer as input activations (131). The input activations denote an output of the preceding layer and also the input to the batch normalization layer.

Next, in the batch normalization layer, the batch normalization (132 and 133) is done in the training mode. The input activations in mini-batch $\{x_1, \ldots, x_m\}$ are normalized, using statistics of activations in the mini-batch. The statistics of activations in the mini-batch is mean, $\mu_B$, and variance, $\sigma_B^2$, of the mini-batch. This batch normalization (132 and 133) in the training mode may be done according to the following equation (1).

$$batchnorm_{training}(x_i) = \gamma \frac{x_i - \mu_B}{\sqrt{\sigma_B^2 + \epsilon}} + \beta \qquad (1)$$

where $\gamma$ denotes a scale parameter and $\beta$ denotes a shift parameter, both of $\gamma$ and $\beta$ parameters are parameters to be trained; $\epsilon$ denotes a predefined value, such as a small value, for example, 0.0001, and is used for stabilizing the transformation. Please note that parameters of the preceding layer and $\gamma$ and $\beta$ parameters of the batch normalization layer are jointly updated using any backpropagation algorithm known in the art, using training data (111).

Depending on the input activations in the mini-batch, the parameters, $\mu_B$ and $\sigma_B^2$, in the equation (1) are changed and, accordingly, its transformation is also changed.

Next, an evaluation of the trained neural network may be done in the following "#2", using the test data (112).

"#2" in FIG. 1 shows a forward pass in a trained preceding layer and a trained batch normalization layer in an inference mode, using the test data (112) derived from the original domain data (101).

The trained preceding layer may be any trained layer preceding each trained batch normalization layer in the trained neural network. The trained preceding layer may be a trained input layer or each of trained hidden layers.

First, the output of the preceding layer is given to the trained batch normalization layer as input activities (141) for the trained batch normalization layer.

Next, in the trained batch normalization layer, the batch normalization (142 and 143) is done in the inference mode. The batch normalization (142 and 143) in the inference mode does not use the aforesaid mean, $\mu_B$, and variance, $\sigma_B^2$. The batch normalization (142 and 143) in the inference mode uses averaged mean of the training data (111) of the base model and the averaged variance of the training data (111) of the base model (i.e. $\mu_{base}$, and $\sigma_{base}^2$, respectively). $\mu_{base}$ and $\sigma_{base}^2$ are often estimated as a final value of running mean and a final value of running variance during training, respectively.

This batch normalization (142 and 143) in the inference mode may be done according to the following equation (2).

$$batchnorm_{inference}(x_i) = \gamma \frac{x_i - \mu_{base}}{\sqrt{\sigma_{base}^2 + \epsilon}} + \beta \qquad (2)$$

where $\gamma$ denotes a scale parameter and $\beta$ denotes a shift parameter, both of $\gamma$ and $\beta$ parameters are $\gamma$ and $\beta$ parameters already trained using training data (111) derived from the original domain data (101); $\mu_{base}$ denotes a final value of running mean of the batch normalization layer before adapted of the trained neural network; $\sigma_{base}^2$ denotes a final value of running variance of the batch normalization layer before adapted of the trained neural network; and $\epsilon$ denotes a predefined value, such as a small value, for example, 0.0001, and is used for stabilizing the transformation.

In a case where the mini-batch size, m, is large enough and, further, input feature distribution is independent and identically distributed (i.e. i. i. d), $\mu_B$ and $\sigma_B^2$ in the equation (1) is similar to $\mu_{base}$, and $\sigma_{base}^2$, respectively.

Accordingly, the aforesaid forward pass as depicted in "#1" when the training mode is finishing and the aforesaid forward pass as depicted in "#2" in the inference mode has matched results.

The equation (2) is used for any input activations in the original domain data (101).

There is no mismatch between the aforesaid forward pass as depicted in "#1" and the aforesaid forward pass as depicted in "#2". This is because the training data (111) and the test data (112) are commonly obtained from the same original domain data (101).

"#3" in FIG. 1 shows a forward pass in an inference mode, using the test data (122) derived from the target domain data (102). The forward pass as depicted in "#3" represents steps for inference outputs, using the test data (122) derived from the target domain data (101).

The transformation of the batch normalization layer in "#3" is the same as that of the batch normalization layer in "#2". Hence, a detail explanation thereof is omitted for the sake of simplicity.

The forward pass as depicted in "#3" should be a starting point for domain adaptation with input activities (141') for the batch normalization (142' and 143').

"#4" in FIG. 1 shows a forward pass in a training mode, using the adaptation data (121) derived from the target domain data (102). The forward pass as depicted in "#4" represents an existing method of adaptation.

The preceding layer may be any layer preceding each batch normalization layer in the neural network. At the starting point of the domain adaptation, the preceding layer corresponds to the preceding layer but trained using the training data (111) derived from the original domain data (101).

First, the output of the preceding layer is given to the batch normalization layer as input activities (151) for the batch normalization layer.

Next, in the batch normalization layer, the batch normalization (152 and 153) is done in the training mode. Mini-batch statistics of target domain data (102) are used for the batch normalization (152 and 153), instead of $\mu_{base}$ and $\sigma_{base}^2$. In the forward pass as depicted in "#4", target domain data is transformed using the aforesaid equation (1), where $\mu_B$ and $\sigma_B^2$ are calculated using activations in a mini-batch in the target domain data (102).

As for γ and β parameters in the aforesaid equation (1), γ and β parameters trained using the training data (111) derived from the original domain data (101) are used as initial values. As described in "#1" above, parameters of the preceding layer and γ and β parameters of the batch normalization layer are jointly updated using any backpropagation algorithm known in the art, using the adaptation data (121).

Statistics of activations, $\mu_B$ and $\sigma_B^2$, in the aforesaid "#4" have considerably different from $\mu_{base}$ and $\sigma_{base}^2$ in the aforesaid "#3", respectively. This is because an input feature distribution of the target domain data (102) is usually different from that of the original domain data (101)

Accordingly, there is mismatch between outputs of the forward pass as depicted in "#3" and those of the forward pass as depicted in "#4".

"#5" in FIG. 1 shows a forward pass in an inference mode, using the test data (123) derived from the target domain data (102). The forward pass as depicted in "#5" represents steps for inference outputs, using the test data (123) derived from the target domain data (102). As stated above, the test data (123) is the same with the test data (122).

The adapted preceding layer may be any adapted layer preceding each adapted batch normalization layer in the adapted neural network which was already adapted as depicted in the aforesaid forward pass as depicted in "#4". The adapted preceding layer may be an adapted input layer or each of adapted hidden layers.

First, the output of the adapted preceding layer is given to the adapted batch normalization layer as input activities (161) for the adapted batch normalization layer.

Next, in the adapted batch normalization layer, the batch normalization (162 and 163) is done in the inference mode. This batch normalization (162 and 163) in the inference mode may be done according to the aforesaid equation (2), with the exception that averaged mean of the adaptation data (121) derived from the target domain data (102) and the averaged variance of the adaptation data (121) derived from the target domain data (102) are used. Further, as the exception above, γ and β parameters in the equation (2) used in this batch normalization (162 and 163) are γ and β parameters already adapted using the adaptation data (121) derived from the target domain data (102).

As stated above, the batch normalization in the training mode and the batch normalization in the inference mode are different from each other.

If the mini-batch size, m, is large enough and input feature distribution is independent and identically distributed, parameter updates of the neural network dominantly affects the difference of these two transformations. In this case, the batch normalization effectively reduces the bad effects of the aforesaid internal covalent shift.

In a case where the domain adaptation or transfer learning starts, input feature distribution difference makes the difference between the training and the inference large.

Thus, input feature distributions are different from each other. Therefore, distributions of their activations are totally different from each other. This mismatch can cause performance degradation for domain adaptation for, for example, an acoustic modeling.

For the acoustic modeling, retraining of using small amount of adaptation data is often done to customize the trained neural network. Some adaptation data has totally different mean and variance from those of original training data. Therefore, retraining with the adaptation data sometimes fail.

Accordingly, the inventors found that the aforesaid mismatch can cause performance degradation for domain adaptation, for example, for the acoustic modeling sometimes.

Hereinafter, an embodiment of the present invention will be described with reference to the following FIGS. 2 to 9.

The idea of an embodiment of the present invention is based on the following perceptions. The adaptation of the batch normalization layers only is in advance performed using adaptation data before retraining of a whole of a neural network.

Figure 2:
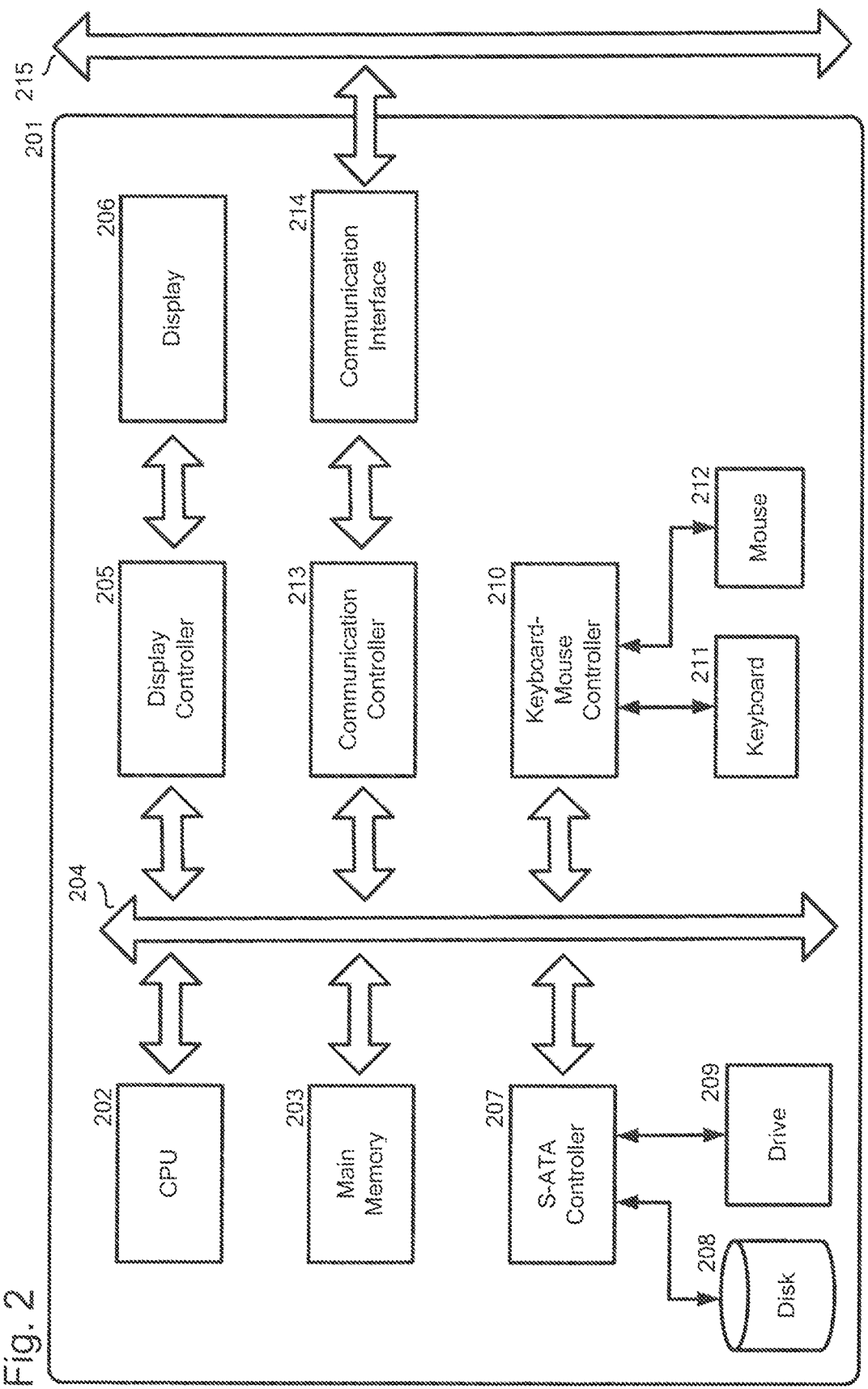
FIG. 2 is a block diagram depicting a computer system used in accordance with an embodiment of the present invention.

With reference now to FIG. 2, FIG. 2 is a block diagram depicting a computer system used in accordance with an embodiment of the present invention.

A computer system (201) may be, for example, a desktop computer, a laptop computer, a notebook computer, a tablet computer, a netbook computer, a server computer, a general- or special-purpose computer, or the like. The server computer may take the form of, for example, a rack-mount type server, a blade type server, or a mainframe server and may implement, for example, a hypervisor for creating and running one or more virtual machines. The computer system (201) may comprise one or more CPUs (202) and a main memory (203), interconnected by way of a bus (204). One or more of the CPUs (202) may be based, for example, on a 32- or 64-bit architecture. One or more of the CPUs (202) may be of, for example, the Power® series of IBM®; the Core i™ series, the Core 2™ series, the Atom™ series, the Xeon™ series, the Pentium® series, or the Celeron® series of Intel Corporation; the Phenom™ series, the Athlon™ series, the Turion™ series, or the Sempron™ series of Advanced Micro Devices, Inc.

The computer system (201) may include an operating system, such as one providing a Windows®, UNIX®, Mac OS®, Linux®, or Java® processing environment. Various software applications, such as Java® applications, Java® virtual machines (VMs), Java® just-in-time (JIT) compilers such as J2EE®, other types programs, and any type of data may be stored in the disk (208) for loading and use by way of the main memory.

A display (206) may be, for example, a liquid crystal display (LCD). The display (206) may be, for example, interconnected to the bus (204) by way of a display controller (205). The display (206) may be used to display, for example, information received by the computer system (201) from one or more other computers over a network, by way of, for example, communication line (215). A memory disk such as a disk (208) may take the form of, for example, a hard disk or SSD. The drive (209) may take the form of, for example, a CD drive, a DVD drive, or a Blue-ray Disk (BD) drive, and may be interconnected to the bus (204) by way of an SATA or IDE controller (207). Various input devices, such as a keyboard (211) or a mouse (212), may be, for example, interconnected to the bus (204) by way of a keyboard-mouse controller (210) or a USB bus (not shown).

A drive (209) may be used to install a program, such as a computer program in accordance with embodiments of the present invention, onto the computer system (201). The program may be, for example, readable and/or loadable from a CD-ROM, a DVD-ROM, or a BD, to the disk (208) or directly to the main memory (203).

A communication interface (214) may implement, for example, an Ethernet® protocol. The communication interface (214) may be, for example, interconnected to the bus (204) by way of a communication controller (213), to physically connect the computer system (201) to a communication line (215). The communication interface (214) may provide a network interface layer including TCP/IP communication protocols, for enabling communications functionality in the computer system (201). The communication line (215) may be, for example, a wired LAN environment or a wireless LAN environment based on wireless LAN connectivity standards such as IEEE® 802.11a/b/g/n.

Figure 3:
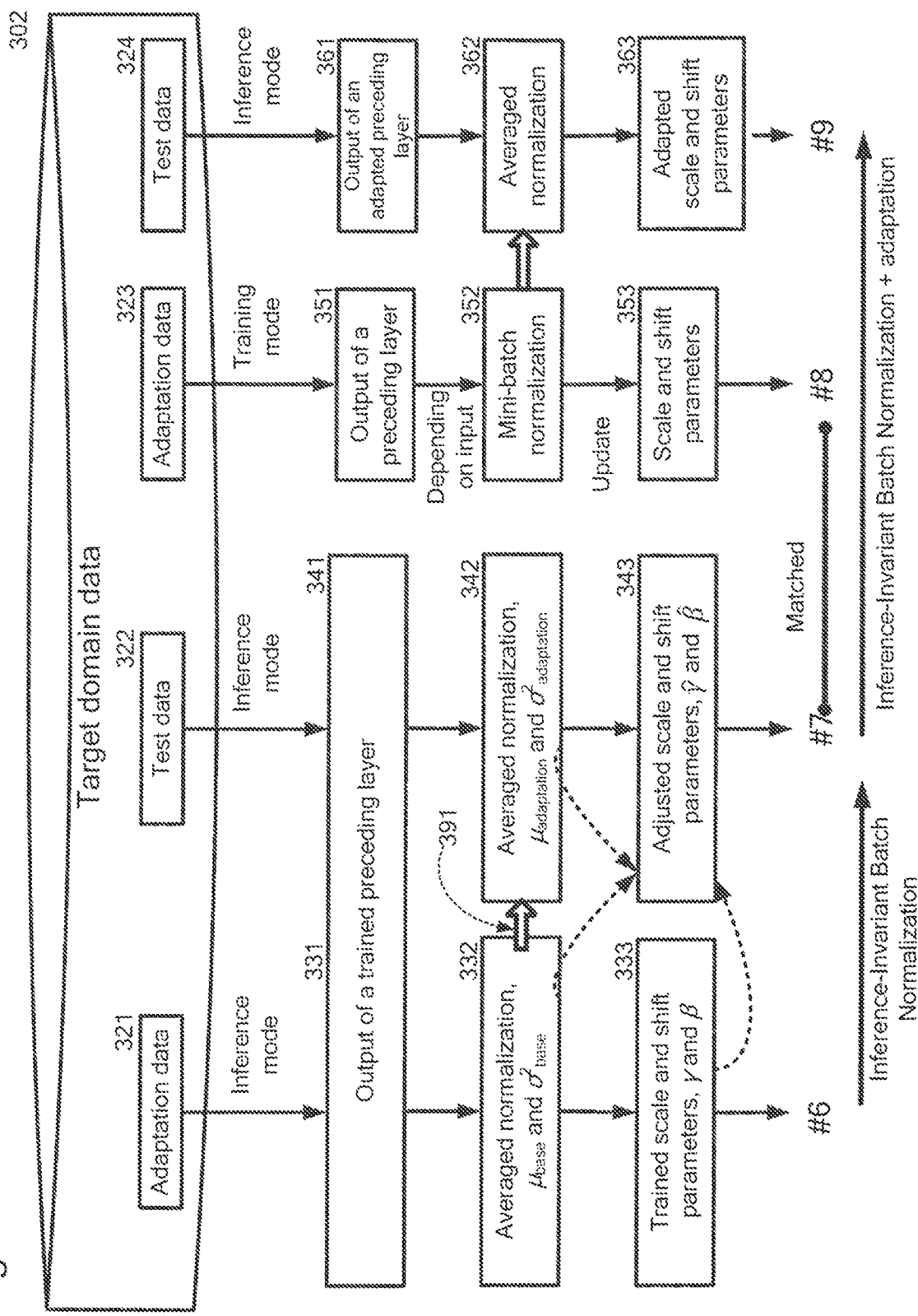
FIG. 3 is a block diagram depicting a method of adaptation of a neural network having batch normalization layers, in accordance with an embodiment of the present invention.

With reference now to FIG. 3, FIG. 3 is a block diagram depicting a method of adaptation of a neural network having batch normalization layers, in accordance with an embodiment of the present invention. As described above, the forward pass as depicted in "#3" in FIG. 1 should be a starting point for domain adaptation. For achieving this, a new batch normalization will be introduced. This new batch normalization is hereinafter called as Inference-Invariant Batch Normalization, IIBN and will be explained by referring to "#6" and "#7" in FIG. 3.

Target domain data (302) is prepared in advance. The target domain data (302) is the same with the target domain data (102) described in FIG. 1.

The target domain data (302) is divided into adaptation data (321), test data (322 and 324) and adaptation data (323). The adaptation data (321) may be the same with or different from the adaptation data (323). Please note that the test data (322) is the same with the test data (324). Further, please note that the test data (322 and 324) is the same with the test data (122 and 123) described in FIG. 1. The division of the target domain data (302) may be done, for example, by randomly separating the target domain data (302) into the adaptation data (321 and 323) and the test data (322 and 324) in a case where the adaptation data (321) is the same with the adaptation data (323). Alternatively, the division of the target domain data (302) may be done, for example, by randomly separating the target domain data (302) into the adaptation data (321), the test data (322 and 324) and the adaptation data (323) in a case where the adaptation data (321) is different from adaptation data (323).

"#6" in FIG. 3 shows a forward pass in an inference mode, using the adaptation data (321) derived from the target domain data (302).

In the forward pass as depicted in "#6", statistics of the batch normalization layer ($\mu$, $\sigma$) are recalculated using an adaption data (321), as explained below.

A trained preceding layer may be any trained layer preceding each trained batch normalization layer in the neural network trained using the training data (111) derived from the original domain data (101) described in FIG. 1. The trained preceding layer may be a trained input layer or each of trained hidden layers.

First, the output of the preceding layer is given to the trained batch normalization layer as input activities (331) for the trained batch normalization layer.

Next, in the trained batch normalization layer, the batch normalization (332 and 333) is done in the inference mode. In the batch normalization (332 and 333), averages of statistics of training data in the original domain data (101), $\mu_{base}$ and $\sigma_{base}^2$, are used. This batch normalization (332 and 333) in the inference mode may be done according to the aforesaid equation (2). However, normalization statistics of adaptation data (321) derived from the target domain data (302) are accumulated (391) on $\mu_B$ and $\sigma_B^2$ to make accumulated normalization statistics of adaptation data (342) as $\mu_{adaptation}$ and $\sigma_{adaptation}^2$ (see 342). Thus, $\mu_{adaptation}$ and $\sigma_{adaptation}^2$ are newly defined and made by freezing (or fixing) all parameters of the neural network including $\mu_{base}$, $\sigma_{base}^2$, $\gamma$, and $\beta$ of the batch normalization layer other than the newly defined parameters, $\mu_{adaptation}$ and $\sigma_{adaptation}^2$, of each batch normalization layer.

The aforesaid $\mu_{adaptation}$ and $\sigma_{adaptation}^2$ are similar to the aforesaid $\mu_B$ and $\sigma_B^2$ for a mini-batch of the target domain data (102) when the domain adaptation starts.

"#7" in FIG. 3 shows a forward pass in an inference mode, using the test data (322) obtained from the target domain data (302). In the forward pass as depicted in "#7", a scale parameter and a shift parameter are adjusted so that "#7" and "#3" described in FIG. 1 have the same inference output. As stated above, there is assumption that the test data (322 and 324) is the same with the test data (122 and 123) described in FIG. 1 in order to attain that "#7" and "#3" described in FIG. 1 have the same inference output.

First, the output of the preceding layer is given to the trained batch normalization layer as input activities (341) for the trained batch normalization layer.

Next, in the trained batch normalization layer, the batch normalization (342 and 343) is done in the inference mode. In the batch normalization (342 and 343), the aforesaid $\mu_{adaptation}$ and $\sigma_{adaptation}^2$ are used instead of the aforesaid $\mu_{base}$ and $\sigma_{base}^2$ which are used in "#2" described in FIG. 1.

In the batch normalization (342 and 343), the trained scale parameter, $\gamma$, and the trained shift parameter, $\beta$, are adjusted to the adjusted scale parameter, $\hat{\gamma}$, and the adjusted shift parameter, $\hat{\beta}$, respectively, so that inference results do not change when statistics for normalization are changed from $\mu_{base}$ and $\sigma_{base}^2$ to $\mu_{adaptation}$ and $\sigma_{adaptation}^2$, respectively. Accordingly, the forward pass as depicted in "#7" for the test data (322) derived from the target domain data (302) is exactly the same inference as the aforesaid forward pass as depicted in "#3" for the test data (122) derived from the original domain data (101). Concretely, the aforesaid $\hat{\gamma}$ and $\hat{\beta}$ may be defined, for example, as the following equation (3).

$$\gamma \frac{x_i - \mu_{base}}{\sqrt{\sigma_{base}^2 + \epsilon}} + \beta = \hat{\gamma} \frac{x_i - \mu_{adaptation}}{\sqrt{\hat{\sigma}_{adaptation}^2 + \epsilon}} + \hat{\beta} \quad (3)$$

From the aforesaid equation (3), the aforesaid $\hat{\gamma}$ and $\hat{\beta}$ may be calculated, for example, using the following equations (4) and (5), respectively.

$$\hat{\gamma} = \gamma \frac{\sqrt{\sigma_{adaptation}^2 + \epsilon}}{\sqrt{\sigma_{base}^2 + \epsilon}} \quad (4)$$

$$\hat{\beta} = \gamma \frac{\mu_{adaptation} - \mu_{base}}{\sqrt{\sigma_{base}^2 + \epsilon}} + \beta \quad (5)$$

When domain adaptation starts after the IIBN, the following equation (6) may be used for the batch normalization (352 and 353 in "#8"), instead of the aforesaid equation (1).

$$batchnorm_{IIBN}(x_i) = \hat{\gamma} \frac{x_i - \mu_B}{\sqrt{\sigma_B^2 + \epsilon}} + \hat{\beta} \quad (6)$$

According to an embodiment of the present invention, domain adaptation described in the following forward pass as depicted in "#8" starts with "#7" as a starting point.

"#8" in FIG. 3 shows the forward pass in a training mode, using the adaptation data (323) derived from the target domain data (302). The forward pass as depicted in "#8" represents a method of adaptation after the aforesaid IIBN.

The preceding layer may be any layer preceding each batch normalization layer in the neural network. At the starting point of the domain adaptation, the preceding layer corresponds to the preceding layer explained in FIG. 1 but trained using the training data (111) derived from the original domain data (101) described in FIG. 1.

First, the output of the preceding layer is given to the batch normalization layer as input activities (351) for the batch normalization layer.

Next, in the batch normalization layer, the batch normalization (352 and 353) is done in the training mode. In the forward pass as depicted in "#8", target domain data is transformed using the aforesaid equation (6), where $\mu_B$ and $\sigma_B^2$ are calculated using activations in a mini-batch in the target domain data (302).

As for $\hat{\gamma}$ and $\hat{\beta}$ parameters in the aforesaid equation (6), $\hat{\gamma}$ and $\hat{\beta}$ parameters adjusted according to the aforesaid equation (4) and (5) respectively are used as initial values. As similar with the aforesaid "#1" described in FIG. 1, parameters of the preceding layer and $\hat{\gamma}$ and $\hat{\beta}$ parameters of the batch normalization layer are jointly updated using any backpropagation algorithm known in the art, using the adaptation data (323).

An output of the aforesaid forward pass as depicted in "#8" matches an output of the forward pass as depicted in "#7" which is exactly the same as an output of the forward pass as depicted in "#3" described in FIG. 1. This is because statistic in a mini-batch in the adaptation data (323) is similar to $\mu_{adaptation}$, and $\sigma_{adaptation}^2$. Therefore, there is no mismatch between the aforesaid forward pass as depicted in "#7" and the aforesaid forward pass as depicted in "#8" when the adaptation starts.

Accordingly, the IIBN makes it possible to use the aforesaid forward pass as depicted in "#3" described in FIG. 1 as initial point of the domain adaptation according to an embodiment of the present invention.

Thus, this embodiment of the present invention can leverage the aforesaid forward pass as depicted in "#3" described in FIG. 1 as a starting point for the domain adaptation properly.

"#9" in FIG. 3 shows a forward pass in an inference mode, using the test data (324). The forward pass as depicted in "#9" represents inference outputs, using the neural network adapted after the IIBN. As stated above, the test data (324) is the same with the test data (322).

The adapted preceding layer may be any adapted layer preceding each adapted batch normalization layer in the adapted neural network which was already adapted as depicted in the aforesaid forward pass as depicted in "#8". The adapted preceding layer may be an adapted input layer or each of adapted hidden layers.

First, the output of the adapted preceding layer is given to the adapted batch normalization layer as input activities (361) for the adapted batch normalization layer.

Next, in the adapted batch normalization layer, the batch normalization (362 and 363) is done in the inference mode. This batch normalization (362 and 363) in the inference mode may be done according to the aforesaid equation (2), with the exception that averaged mean and averaged variance of the adaptation data (323) are used instead of the averaged mean of the training data (111) of the base model and the averaged variance of the training data (111) of the base model, respectively. The averaged mean and averaged variance of the adaptation data (323) may be often estimated as a final value of running mean and a final value of running variance during training using the adaptation data (323). Further, $\gamma$ and $\beta$ parameters in the equation (2) are replaced with $\hat{\gamma}$ and $\hat{\beta}$ parameters adapted using the adaptation data (323) after adjusted.

The working example mentioned below shows that the IIBN has the better performance than the existing method of adaptation.

FIGS. 4 to 7 are flowcharts depicting a process of adapting a neural network having one or more batch normalization layers, in accordance with an embodiment of the present invention.

In the flowcharts of the FIGS. 4 to 7, the following neural network may be used: the neural network having the one or more batch normalization layers was already trained using training data obtained from domain data, such as original domain data which is different from target domain data. The neural network has the following layers: an input layer, hidden layers and an output layer. Each of the input layer and hidden layers has a bath normalization layer immediately after it. Each of the batch normalization layers has the following parameters: a mean, a variance, a scale parameter, and a shift parameter.

Figure 4:
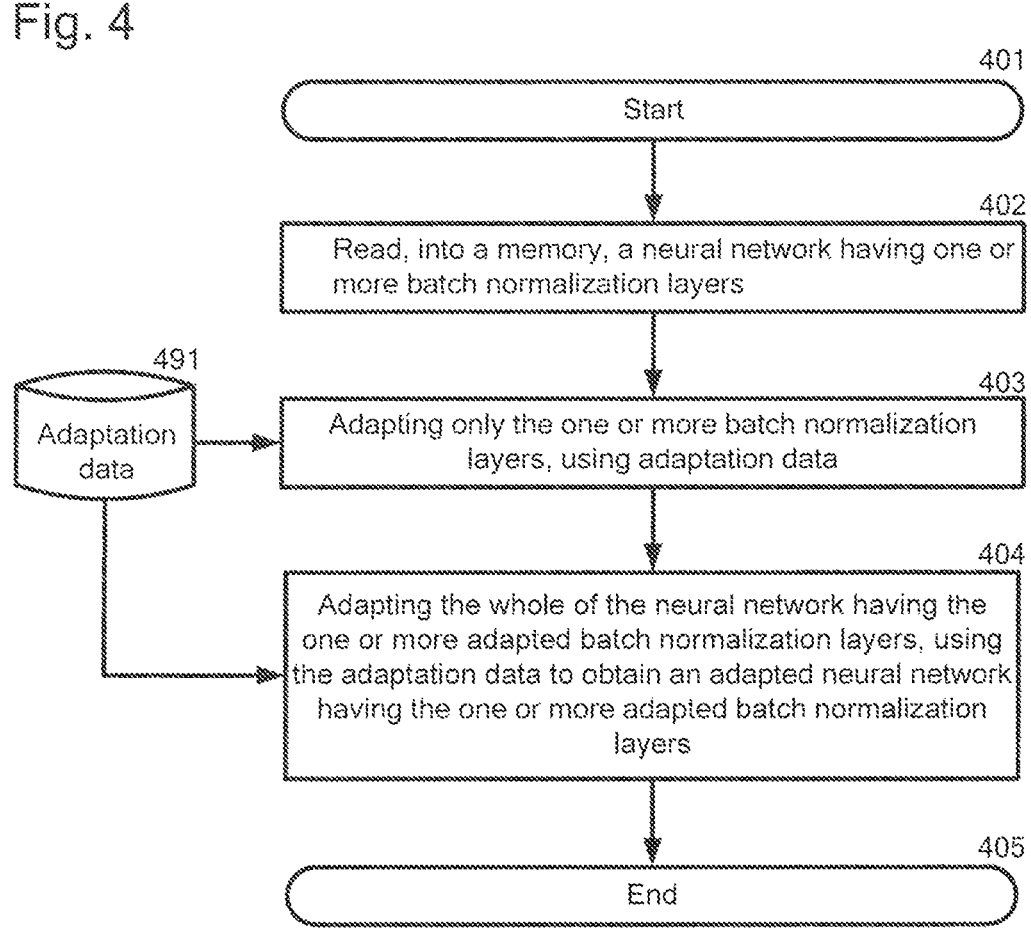
FIGS. 4 to 7 are flowcharts depicting a process of adapting a neural network having batch normalization layers, in accordance with an embodiment of the present invention.
Figure 5:
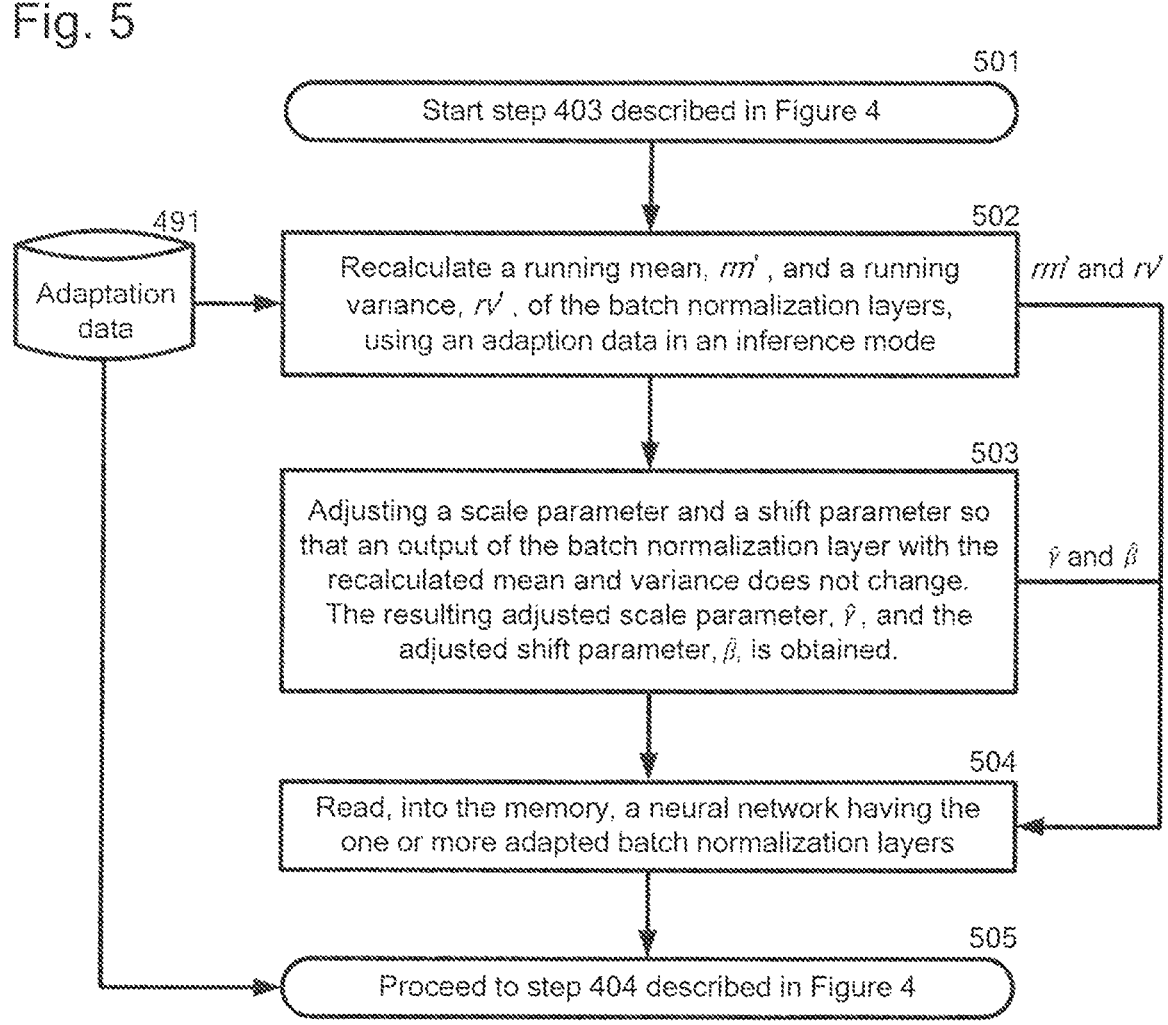
Figure 6:
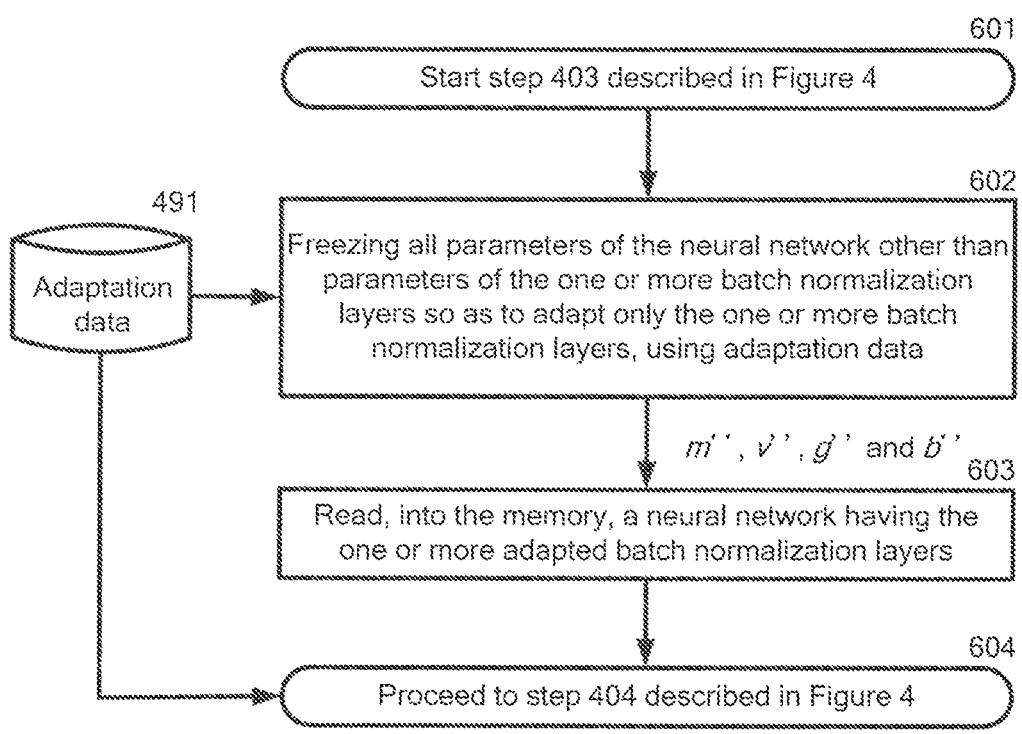
Figure 7:
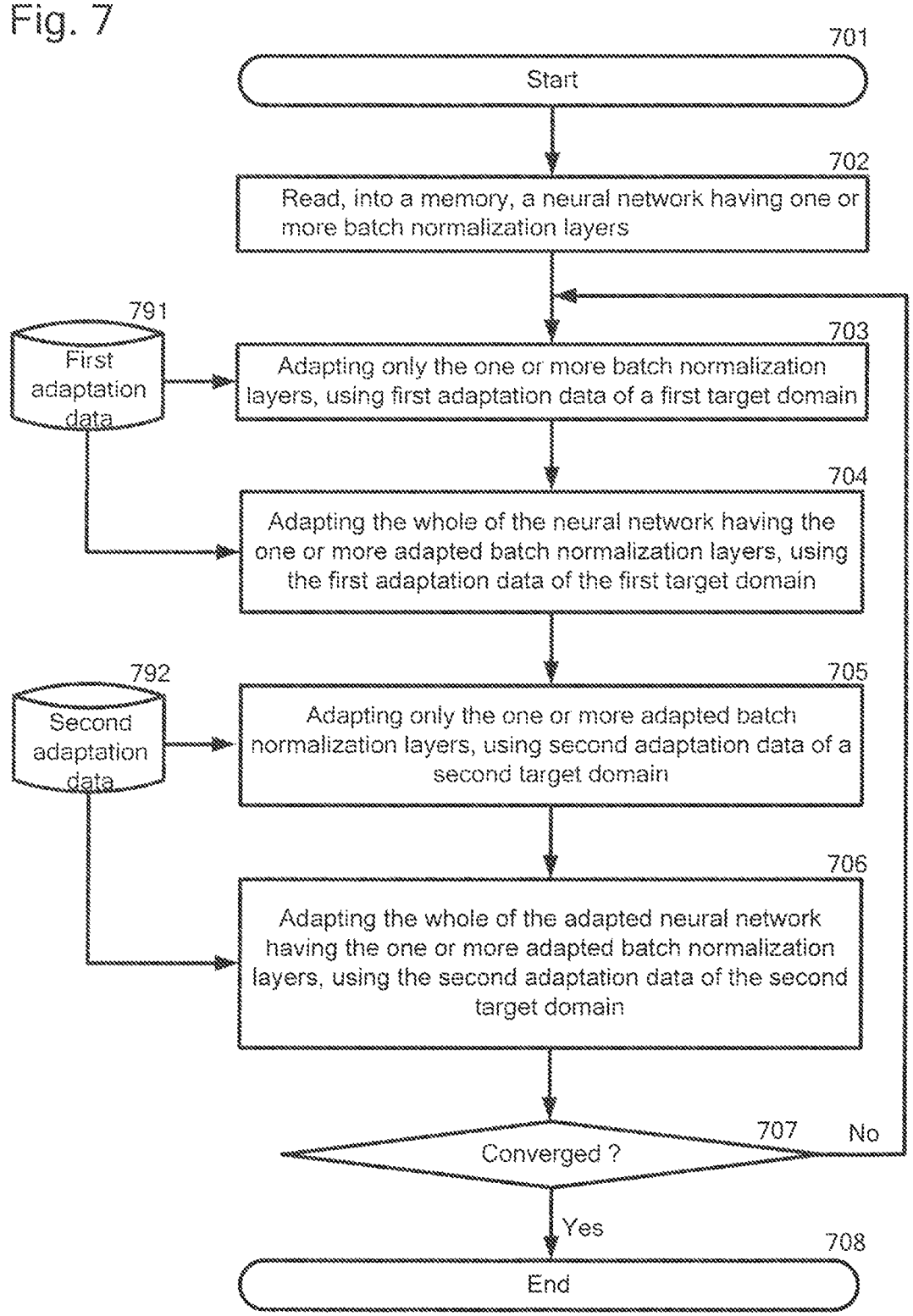

FIG. 4 shows a generic concept of the process of adapting a neural network having batch normalization layers. FIGS. 5 and 6 show more specific concepts of the step 403 described in FIG. 4. FIG. 7 shows an embodiment using the process described in FIG. 4.

In each of steps described in FIGS. 4 to 7, a subject of a step may be a computer system such as the computer system (201) described in FIG. 2.

With reference now to FIG. 4, FIG. 4 is a flowchart depicting a process of adapting, using adaptation data, a neural network having batch normalization layers, in accordance with an embodiment of the present invention.

At step 401, the computer system starts the process of adapting, using adaptation data (491) of a target domain, the neural network having the one or more batch normalization layers.

At step 402, the computer system reads, into a memory such as the main memory (203) described in FIG. 2, the neural network having the one or more batch normalization layers.

At step 403, the computer system adapts only the one or more batch normalization layers, using the adaptation data (491). In this step, only the parameters of the one or more batch normalization layers are adapted using the adaptation data (491). The adaptation data (491) were derived from domain data, such as target domain data.

One detailed embodiment of the adapting only the one or more batch normalization layers will be explained by referring to FIG. 5 mentioned below in which the adapting only the one or more batch normalization layers is done in an inference mode. Another detailed embodiment of the adapting only the one or more batch normalization layers will be explained by referring to FIG. 6 mentioned below in which the adapting only the one or more batch normalization layers is done in a training mode.

As a result of step 403, the one or more adapted batch normalization layers can be obtained and then the neural network having the one or more adapted batch normalization layers can be also obtained.

At step 404, the computer system adapts the whole of the neural network having the one or more adapted batch normalization layers, using the adaptation data (491). As a result of step 404, the adapted neural network having the one or more adapted batch normalization layers can be obtained.

At step 405, the computer system terminates the aforesaid process.

The obtained trained neural network can be thereafter used for obtaining a result against input data in the target domain.

According to the aforesaid generic concept of the process, the steps can be summarized as follows: the method comprises adapting only the one or more batch normalization layers using adaptation data; and adapting the whole of the neural network having the one or more adapted batch normalization layers, using the adaptation data.

With reference now to FIG. 5, FIG. 5 is a flowchart depicting the aforesaid one detailed embodiment of the step 403 described in FIG. 4.

This one detailed embodiment described in FIG. 5 corresponds to the embodiment described in FIG. 3.

After the step 402 described in FIG. 4, at step 501, the computer system starts the process of the aforesaid step 403.

At step 502, the computer system recalculates, in an inference mode, a running mean of each batch normalization layer, rm' and a running variance, rv', of each batch normalization layer, using the adaption data (491). The step 502 may comprise the embodiment of the forward pass as depicted in "#6" described in FIG. 3. As mentioned above, please note that the recalculated mean and the variance in an inference mode means a final value of running mean which was obtained using the adaptation data (491), rm', and a final value of running variance which was obtained using the adaptation data (491), rv'. Thus, the running mean, rm', and the running variance, rv' correspond to $\mu_{adaptation}$ and $\sigma_{adaptation}^2$ described in FIG. 3, respectively. Further, a fixed mean mentioned below, rm, and a fixed variance mentioned below, rv, correspond to $\mu_{base}$ and $\sigma_{base}^2$, respectively. As stated in the above-mentioned "#6" in FIG. 3, $\mu_{base}$ and $\sigma_{base}^2$ are used for the transformation in the inference mode. Also, please note that, in the batch normalization in the inference mode in "#7" described in FIG. 3, the aforesaid rm' and rv' are used instead of a variance of mini-batch and a mean of mini-batch in a training mode, respectively.

After step 502 and prior to step 503, the parameters of the batch normalization layer are replaced with the mean and the variance which were recalculated at step 502, respectively.

At step 503, the computer system adjusts a scale parameter and a shift parameter so that an output of the batch normalization layer with the recalculated mean and variance does not change. This is done for the purpose of compensating of output of the neural network. The step 503 may comprise the embodiment of the forward pass as depicted in a part (see 343) of "#7" described in FIG. 3. Accordingly, the descriptions on the part (see 343) of "#7" described in FIG. 3 can be also applied to step 503.

The scale parameter may be adjusted according to the following equation (7).

$$\hat{\gamma} = \gamma \frac{\sqrt{\sigma_{adaptation}^2 + \epsilon}}{\sqrt{\sigma_{base}^2 + \epsilon}} \quad (7)$$

where $\hat{\gamma}$ denotes an adjusted scale parameter; $\gamma$ denotes a scale parameter of a batch normalization layer before adapted of the trained neural network which was read at the aforesaid step 402; $\sigma_{adaptation}^2$ denotes a final value of running variance recalculated using the adaptation data at the step 502; $\sigma_{base}^2$ denotes a final value of running variance of the batch normalization layer before adapted of the trained neural network which was read at the aforesaid step 402; and $\in$ denotes a predefined value, such as a small value, for example, 0.0001, and is used for stabilizing the transformation.

The shift parameter may be adjusted according to the following equation (8).

$$\hat{\beta} = \gamma \frac{\mu_{adaptation} - \mu_{base}}{\sqrt{\sigma_{base}^2 + \epsilon}} + \beta \quad (8)$$

where $\hat{\beta}$ denotes an adjusted shift parameter; $\beta$ denotes a shift parameter of a batch normalization layer before adapted of the trained neural network which was read at the aforesaid step 402; $\gamma$ denotes a scale parameter of a batch normalization layer of the trained neural network before adapted which was read at the aforesaid step 402; $\mu_{adaptation}$ denotes a final value of running mean recalculated at the step 502; $\mu_{base}$ denotes a final value of running mean of the batch normalization layer before adapted of the trained neural network which was read at the aforesaid step 402; $\sigma_{base}^2$ denotes a final value of running variance of the batch normalization layer before adapted of the trained neural network which was read at the aforesaid step 402; and $\epsilon$ denotes a predefined value, such as a small value, for example, 0.0001, and is used for stabilizing the transformation.

After step 503 and prior to step 504, the parameters of each batch normalization layer are replaced with the scale parameter and the shift parameter which were adjusted at step 503, respectively.

At step 504, if necessary, the computer system may read, into the memory, the neural network having the one or more adapted batch normalization layers. Each of the adapted batch normalization layers has the recalculated mean and the recalculated variance and further has the adjusted scale parameter and the adjusted shift parameter.

At step 505, the computer system proceeds to step 404 described in FIG. 4. The step 404 may comprise the embodiment of the forward pass as depicted in "#8" described in FIG. 3.

A mean, $\mu_B$, and a variance, $\sigma_B^2$, of a mini-batch of adaptation data are similar to the aforesaid final value of running mean, $\mu_{adaptation}$, and the aforesaid final value of running variance, $\sigma_{adaptation}^2$. Accordingly, transformations of the one or more batch normalization layers in the inference mode do not change drastically from those of the original batch normalization layers in the inference mode.

In a case where steps 502 and 503 are not performed, first several updates with adaptation data would destruct the neural network, because transformations of the one or more batch normalization layers in the training mode change drastically from those of the inference mode.

According to the aforesaid one detailed embodiment, the steps can be summarized as follows: the method may comprise recalculating the mean and the variance using the adaptation data; adjusting the scale parameter and the shift parameter so that an output of the one or more batch normalization layers with the recalculated mean and variance does not change; and adapting the whole of the neural network having the one or more adapted batch normalization layers, using the adaptation data.

With reference now to FIG. 6, FIG. 6 is a flowchart depicting the aforesaid another detailed embodiment of the step 403 described in FIG. 4.

After the step 402 described in FIG. 4, at step 601, the computer system starts the process of the aforesaid step 403.

At step 602, the computer system freezes all parameters of the neural network other than parameters of the one or more batch normalization layers so as to adapt only the batch normalization layer in a training mode, using the adaptation data (491). The parameters of the one or more batch normalization layers are a mean, m, a variance, v, a scale parameter, g, and a shift parameter, b. The freezing means that a predefined parameter(s) is not updated. The adapting or adaptation means that a predefined parameter(s) is updated by training this parameter(s) using adaptation data.

At step 602, the computer system adapts the only the batch normalization layer using the adaptation data (491) so as to obtain a mean after the adaptation at step 602, m", a variance after the adaptation at step 602, v ", a scale parameter after the adaption, g", and a shift parameter after the adaptation, b". The scale parameter after the adaption, g", and the shift parameter after the adaptation, b" are obtained using any backpropagation algorithm known in the art, using adaptation data (491).

Freezing all parameters of the neural network other than parameters of the one or more batch normalization layers and then adapting, using adapting data, only the one or more batch normalization layers allows a computer system to compensate the mismatch, for example, between the aforesaid forward pass as depicted in "#3" described in FIG. 1 and the aforesaid forward pass as depicted in "#4" described in FIG. 1.

In other words, at step 602, the neural network is retrained using the adaptation data, wherein all parameters of the neural network other than parameters of the one or more batch normalization layers are not updated by the aforesaid freezing, meanwhile, the parameters of the one or more batch normalization layers are updated by training these parameters using the adaptation data. As a result of step 502, the resulting aforesaid g" and b" are obtained. Please note that the batch normalization is performed in the training mode according to the aforesaid equation (1), wherein mini-batch statistics of adaptation data, i.e. the aforesaid adaptation data (491), are used.

After step 602 and prior to step 603, the parameters of each batch normalization layer are replaced with m", v", g", and b" which were adapted at the foresaid step 602, respectively.

At step 603, if necessary, the computer system may read, into the memory, the neural network having the one or more adapted batch normalization layers. Each of the adapted batch normalization layers has m", v", g", and b" which were adapted at the foresaid step 602.

At step 604, the computer system proceeds to step 404 described in FIG. 4.

According to the aforesaid another detailed embodiment, the steps can be summarized as follows: the method may comprise freezing all parameters of the neural network other than parameters of the one or more batch normalization layers so as to adapt the one or more batch normalization layers using the adaptation data; and adapting the whole of the neural network having the one or more adapted batch normalization layers, using the adaptation data. The parameters of the one or more batch normalization layers are a mean, a variance, a scale parameter and a shift parameter, as stated above.

With reference now to FIG. 7, FIG. 7 is a flowchart depicting a process of adapting, using adaptation data (791) of a first target domain and adaptation data (792) of a second target domain, a neural network having batch normalization layers, in accordance with the embodiment of the present invention described in FIG. 4. The first target domain and the second target domain are different from each other, for example, in subjects or targets.

In this embodiment, the following two different adaptation data is used, that is first adaptation data of a first target domain (hereinafter referred to as "first adaptation data") and second adaptation data of a second target domain (hereinafter referred to as "second adaptation data").

At step 701, the computer system starts the process of adapting, using the first adaptation data (791) and the second adaptation data (792), the neural network having batch normalization layers.

At step 702, as similar with the aforesaid step 402 described in FIG. 4, the computer system reads, into a memory such as the main memory (203) described in FIG. 2, the neural network having the one or more batch normalization layers.

At step 703, as similar with the aforesaid step 403 described in FIG. 4, the computer system adapts only the one or more batch normalization layers, using the first adaptation data (791). For example, the adaptation steps described in FIG. 5 or 6 may be done. As a result of step 703, the one or more adapted batch normalization layers can be obtained.

At step 704, as similar with the aforesaid step 404 described in FIG. 4, the computer system adapts the whole of the neural network having the one or more adapted batch normalization layers, using the first adaptation data (791). As a result of step 704, the trained neural network can be obtained.

At step 705, as similar with the aforesaid step 403 described in FIG. 4, the computer system adapts only the one or more batch normalization layers in the trained neural network obtained from step 704, using the second adaptation data (792). For example, the adaptation steps described in FIG. 5 or 6 may be done. As a result of step 705, the one or more further adapted batch normalization layers can be obtained.

At step 706, as similar with the aforesaid step 404 described in FIG. 4, the computer system adapts the whole of the neural network having the one or more further adapted batch normalization layers, using the second adaptation data (792). As a result of step 706, the further trained neural network can be obtained.

At step 707, the computer system judges whether parameters of each batch normalization layer converges or not. The parameters of the batch normalization layer are a mean, a variance, a scale parameter, and a shift parameter. If the judgment is positive, the computer system proceeds to a final step 708. Meanwhile if the judgment is negative, the computer system proceeds back to step 703 to repeat steps 703 to 707.

At step 708, the computer system terminates the aforesaid process.

The obtained trained neural network after the converge can be thereafter used for obtaining a result against both input data in the first target domain and input data in the second target domain in an operation mode.

According to this embodiment, the same approach mentioned in FIGS. 5 and 6 can be used to train the neural network, using multiple sets of adaptation data.

According to the aforesaid another detailed embodiment, the steps can be summarized as follows: adapting only the one or more batch normalization layers using first adaptation data of a first target domain; adapting the whole of the neural network having the adapted batch normalization layers, using the first adaptation data; adapting only the one or more adapted batch normalization layers using second adaptation data of a second target domain; and adapting the whole of the adapted neural network having the one or more adapted batch normalization layers, using the second adaptation data.

Figure 8:
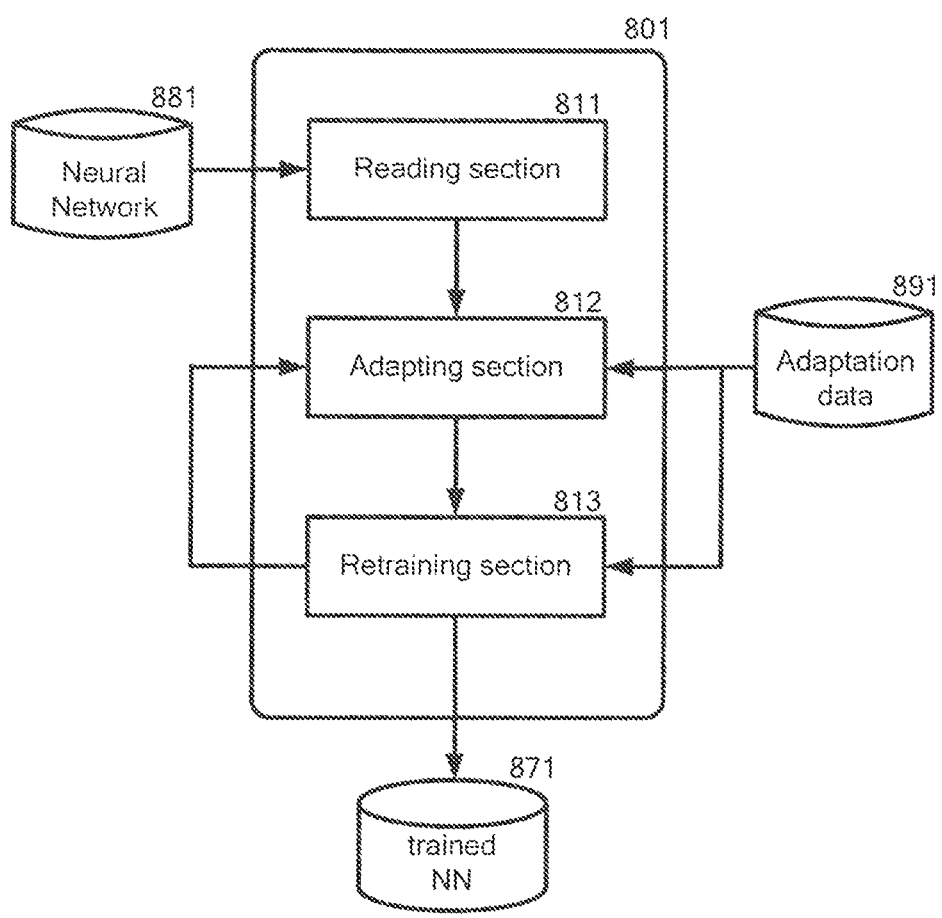
FIG. 8 is an overall functional block diagram of depicting a computer system hardware in relation to the process of FIGS. 4 to 7, in accordance with an embodiment of the present invention.

With reference now to FIG. 8, FIG. 8 is an overall functional block diagram of depicting a computer system hardware in relation to the process of FIGS. 4 to 7, in accordance with an embodiment of the present invention.

A computer system (801) may correspond to the computer system (201) described in FIG. 2.

The computer system (801) may comprise a reading section (811), an adapting section (812) and a retraining section (813).

The reading section (811) reads, into a memory such as the main memory (203) described in FIG. 2, a neural network (881) having one or more batch normalization layers. The neural network (881) having the one or more batch normalization layers was already trained using training data obtained from domain data, such as original domain data, which is different from target domain data. Each of an input layer and hidden layers has a batch normalization layer immediately after it. Each of the batch normalization layers has the following parameters: a mean, a variance, a scale parameter, and a shift parameter.

The reading section (811) may perform step 402 described in FIG. 4, and step 702 described in FIG. 7.

The adapting section (812) adapts only the one or more batch normalization layers using adaptation data (891).

In one embodiment, the adapting section (812) may recalculate, for each batch normalization layer, the mean and the variance using the adaptation data (891); and adjust, for each batch normalization layer, the scale parameter and the shift parameter so that an output of the batch normalization layer with the recalculated mean and variance does not change.

In another embodiment, the adapting section (812) may freeze all parameters of the neural network other than parameters of each batch normalization layer so as to adapt only the parameters of the batch normalization layer using the adaptation data (891).

The adapting section (812) may perform step 403 described in FIG. 4, steps 502 to 504 described in FIG. 5, steps 602 and 603 described in FIG. 6, and steps 703 and 705 described in FIG. 7.

The retraining section (813) adapts the whole of the neural network having the one or more adapted batch normalization layers, using the adaptation data (891), to form a trained neural network (871).

The retraining section (813) may perform step 404 described in FIG. 4, and steps 704, 706 and 707 described in FIG. 7.

Figure 9:
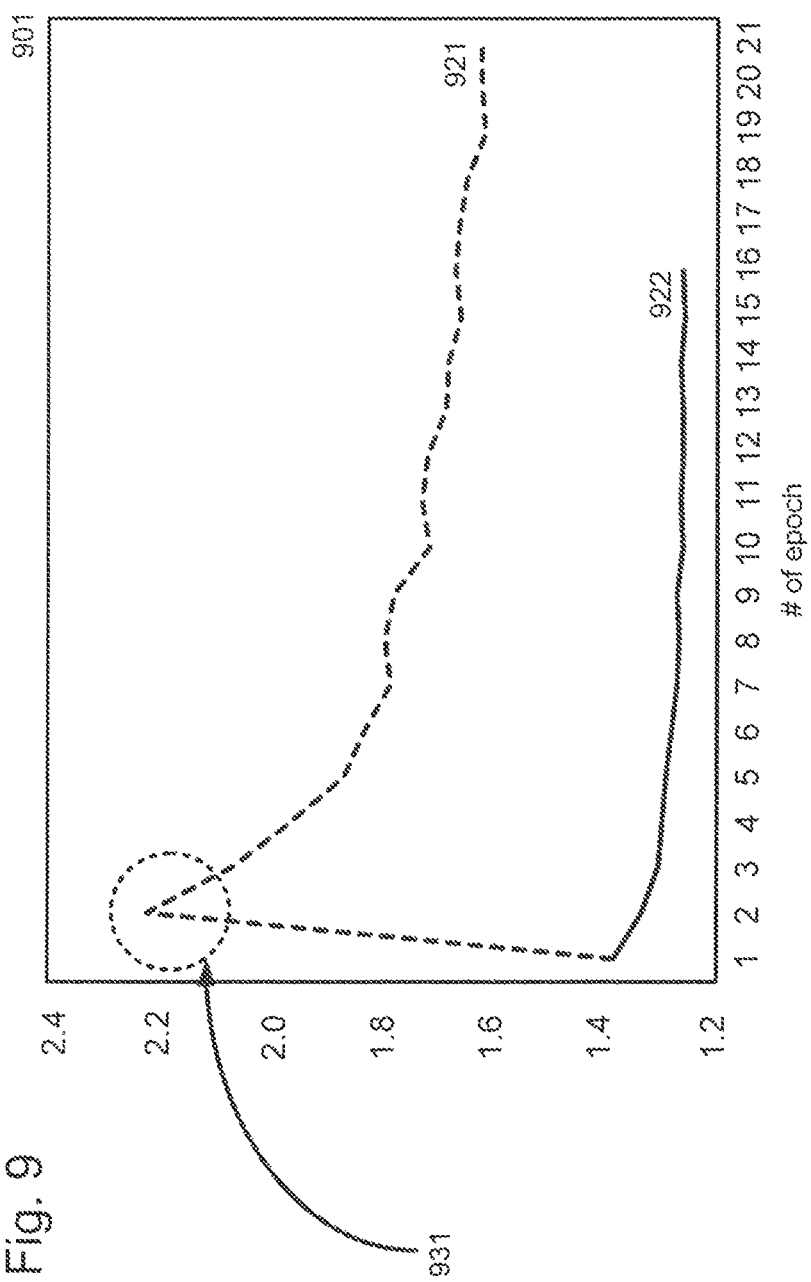
FIG. 9 depicts aspects of a working example of adapting a neural network having batch normalization layers, in accordance with an embodiment of the present invention.

With reference now to FIG. 9, FIG. 9 depicts aspects of a working example of adapting a neural network having batch normalization layers, in accordance with an embodiment of the present invention.

Domain data consisted of acoustic data in Japanese was provided from a call center. This domain data is used for target domain data. The adaptation is made for supervised domain adaptation of Japanese narrowband (8 k sampling data) model.

Training data for a neural network as a base model was about 2 k hours of various domain data. Adaptation data for domain adaptation was about 10 hours of a specific call center. Validation data was about one hour of the specific call center. Test data was about one hour of the specific call center. The transcripts of adaptation data was used for supervised adaptation.

VGG was used as an acoustic model (hereinafter referred to as "AM"). The VGG operated on blocks of 48 consecutive 40-dimensional logmel frames augmented with first and second derivatives. The logmels were globally variance normalized and mean normalized per utterance. The VGG had 13 convolutional layers and 5 fully connected layers. The batch normalization layers were inserted after every convolutional and full connected layers except the last layer. As for the batch normalization layers after convolutional layers, normalization was applied for each frequency and feature map. ReLU activation was inserted after every batch normalization layers. The VGG was trained with the training data by using the cross entropy and SGD with manually tuned learning rate and decay schedule. A standard word 3-gram model was used in common for all evaluation. As for AM domain adaptation, learning rate and decay schedule was tuned so that the existing technique of adaptation achieved the best performance. The same learning rate and schedule tuned for the existing technique of adaptation for the other experiments were applied.

A character error rate, CER, was used as evaluation metric. The existing technique of adaptation outperforms the baseline, but its gain was relatively small.

Graph (901) shows that the existing technique of adaptation (921) and customization with an embodiment of the present invention (922). The circle (931) shows that drastic change of the batch normalization transformation destructs the neural network.

Table (911) shows that the CER of customization with an embodiment of the present invention is smaller than that of the base line. Meanwhile, Table (911) further shows that the CER of customization without an embodiment of the present invention is worse than that of the base line.

Accordingly, the CER was improved according to the aforesaid working example.

The present invention may be a method, a system, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for adapting a trained neural network having one or more batch normalization layers, the method comprising:
adapting only the one or more batch normalization layers using adaptation data; and
adapting the whole of the neural network having the one or more adapted batch normalization layers, using the adaptation data,
wherein each batch normalization layer has a mean, a variance, a scale parameter, and a shift parameter,
wherein the neural network having the one or more batch normalization layers was already trained using training data derived from source domain data, the adaptation data is derived from target domain data; and the scale parameter is adjusted according to the following equation:

$$\hat{\gamma} = \gamma \frac{\sqrt{\sigma_{adaptation}^2 + \epsilon}}{\sqrt{\sigma_{base}^2 + \epsilon}}$$

where $\hat{\gamma}$ denotes an adjusted scale parameter; β denotes the scale parameter of the batch normalization layer before adapted, $\sigma_{adaptation}^2$ denotes a final value of running variance recalculated using the adaptation data, $\sigma_{base}^2$ denotes a final value of running variance of the batch normalization layer before adapted, and E denotes a predefined value.

2. The method according to claim 1, wherein the adapting only the one or more batch normalization layers comprises:
recalculating, for each batch normalization layer, the mean and the variance using the adaptation data; and
adjusting, for each batch normalization layer, the scale parameter and the shift parameter so that an output of the batch normalization layer with the recalculated mean and variance does not change.

3. The method according to claim 1, wherein the neural network having the one or more batch normalization layers was already trained using training data derived from source domain data, the adaptation data is derived from target domain data; and the shift parameter is adjusted according to the following equation:

$$\hat{\beta} = \gamma \frac{\mu_{adaptation} - \mu_{base}}{\sqrt{\sigma_{base}^2 + \epsilon}} + \beta$$

where $\hat{\beta}$ denotes an adjusted shift parameter, β denotes the shift parameter of the batch normalization layer before adapted, γ denotes the scale parameter of the batch normalization layer before adapted, $\mu_{adaptation}$ denotes a final value of running mean recalculated using the adaptation data, $\mu_{base}$ denotes a final value of running mean of the batch normalization layer before adapted, $\sigma_{base}^2$ denotes a final value of running variance of the batch normalization layer before adapted, and ϵ denotes a predefined value.

4. The method according to claim 1, wherein the adapting only the one or more batch normalization layers comprises
freezing all parameters of the neural network other than parameters of each batch normalization layer so as to adapt only the parameters of the batch normalization layer using the adaptation data, wherein the parameters of the batch normalization layer are a mean, a variance, a scale parameter, and a shift parameter.

5. The method according to claim 1, wherein the neural network is a convolutional neural network, a recurrent neural network, or a feed-forward neural network.

6. The method according to claim 1, wherein the adapting only the one or more batch normalization layers and the adapting the whole of the neural network are done using a first adaptation data; and the method further comprising
adapting only the one or more adapted batch normalization layers using second adaptation data of a second target domain; and
adapting the whole of the adapted neural network having the one or more adapted batch normalization layers, using the second adaptation data.

7. The method according to claim 6, wherein the following adaptations are iterated until parameters of each batch normalization layer converges: the adapting only the one or more adapted batch normalization layers using the first adaptation data, the adapting the whole of the adapted neural network using the first adaptation data, the adapting only the one or more adapted batch normalization layers using the second adaptation data, and the adapting the whole of the adapted neural network using the second adaptation data.

8. A computer system, comprising:
one or more processors; and
a memory storing a program which, when executed on the processor, performs an operation for adapting a trained neural network having one or more batch normalization layers, the operation comprising:
adapting only the one or more batch normalization layers using adaptation data; and
adapting the whole of the neural network having the one or more adapted batch normalization layers, using the adaptation data,
wherein each batch normalization layer has a mean, a variance, a scale parameter, and a shift parameter,
wherein the neural network having the one or more batch normalization layers was already trained using training data derived from source domain data, the adaptation data is derived from target domain data; and the scale parameter is adjusted according to the following equation:

$$\hat{\gamma} = \gamma \frac{\sqrt{\sigma_{adaptation}^2 + \epsilon}}{\sqrt{\sigma_{base}^2 + \epsilon}}$$

where $\hat{\gamma}$ denotes an adjusted scale parameter, γ denotes the scale parameter of the batch normalization layer before adapted, $\sigma_{adaptation}^2$ denotes a final value of running variance recalculated using the adaptation data, $\sigma_{base}^2$ denotes a final value of running variance of the batch normalization layer before adapted, and ϵ denotes a predefined value.

9. The computer system according to claim 8, wherein the adapting only the one or more batch normalization layers comprises:
recalculating, for each batch normalization layer, the mean and the variance using the adaptation data; and
adjusting, for each batch normalization layer, the scale parameter and the shift parameter so that an output of the batch normalization layer with the recalculated mean and variance does not change.

10. The computer system according to claim 8, wherein the neural network having the one or more batch normalization layers was already trained using training data derived from source domain data, the adaptation data is derived from target domain data; and the shift parameter is adjusted according to the following equation:

$$\hat{\beta} = \gamma \frac{\mu_{adaptation} - \mu_{base}}{\sqrt{\sigma_{base}^2 + \epsilon}} + \beta$$

where $\hat{\beta}$ denotes an adjusted shift parameter, β denotes the shift parameter of the batch normalization layer before adapted, γ denotes the scale parameter of the batch normalization layer before adapted, $\mu_{adaptation}$ denotes a final value of running mean recalculated using the adaptation data, $\mu_{base}$ denotes a final value of running mean of the batch normalization layer before adapted, $\sigma_{base}^2$ denotes a final value of running variance of the batch normalization layer before adapted, and $\epsilon$ denotes a predefined value.

11. The computer system according to claim 8, wherein the adapting only the one or more batch normalization layers comprises
freezing all parameters of the neural network other than parameters of each batch normalization layer so as to adapt only the parameters of the batch normalization layer using the adaptation data, wherein the parameters of the batch normalization layer are a mean, a variance, a scale parameter, and a shift parameter.

12. The computer system according to claim 8, wherein the neural network is a convolutional neural network, a recurrent neural network, or a feed-forward neural network.

13. A computer program product for adapting a trained neural network having one or more batch normalization layers, the computer program product comprising a computer readable storage medium having program instructions embodied therewith, the program instructions executable by a computer to cause the computer to perform a method comprising:
adapting only the one or more batch normalization layers using adaptation data; and
adapting the whole of the neural network having the one or more adapted batch normalization layers, using the adaptation data,
wherein each batch normalization layer has a mean, a variance, a scale parameter, and a shift parameter
wherein the neural network having the one or more batch normalization layers was already trained using training data derived from source domain data, the adaptation data is derived from target domain data; and the scale parameter is adjusted according to the following equation:

$$\hat{\gamma} = \gamma \frac{\sqrt{\sigma_{adaptation}^2 + \epsilon}}{\sqrt{\sigma_{base}^2 + \epsilon}}$$

where $\hat{\gamma}$ denotes an adjusted scale parameter, $\gamma$ denotes the scale parameter of the batch normalization layer before adapted, $\sigma_{adaptation}^2$ denotes a final value of running variance recalculated using the adaptation data, $\sigma_{base}^2$ denotes a final value of running variance of the batch normalization layer before adapted, and $\epsilon$ denotes a predefined value.

14. The computer program product according to claim 13, wherein
the adapting only the one or more batch normalization layers comprises:
recalculating, for each batch normalization layer, the mean and the variance using the adaptation data; and
adjusting, for each batch normalization layer, the scale parameter and the shift parameter so that an output of the batch normalization layer with the recalculated mean and variance does not change.

15. The computer program product according to claim 13, wherein the neural network having the one or more batch normalization layers was already trained using training data derived from source domain data, the adaptation data is derived from target domain data; and the shift parameter is adjusted according to the following equation:

$$\hat{\beta} = \gamma \frac{\mu_{adaptation} - \mu_{base}}{\sqrt{\sigma_{base}^2 + \epsilon}} + \beta$$

where $\hat{\beta}$ denotes an adjusted shift parameter, $\beta$ denotes the shift parameter of the batch normalization layer before adapted, $\gamma$ denotes the scale parameter of the batch normalization layer before adapted, $\mu_{adaptation}$ denotes a final value of running mean recalculated using the adaptation data, $\mu_{base}$ denotes a final value of running mean of the batch normalization layer before adapted, $\sigma_{base}^2$ denotes a final value of running variance of the batch normalization layer before adapted, and $\epsilon$ denotes a predefined value.

16. The computer program product according to claim 13, wherein the adapting only the one or more batch normalization layers comprises
freezing all parameters of the neural network other than parameters of each batch normalization layer so as to adapt only the parameters of the batch normalization layer using the adaptation data, wherein the parameters of the batch normalization layer are a mean, a variance, a scale parameter, and a shift parameter.

17. The computer program product according to claim 13, wherein the neural network is a convolutional neural network, a recurrent neural network, or a feed-forward neural network.

* * * * *